Sept. 6, 1927.                     G. AGOBIAN                     1,641,245
                              FRUIT PRESSING MACHINE
                              Filed Sept. 12, 1925
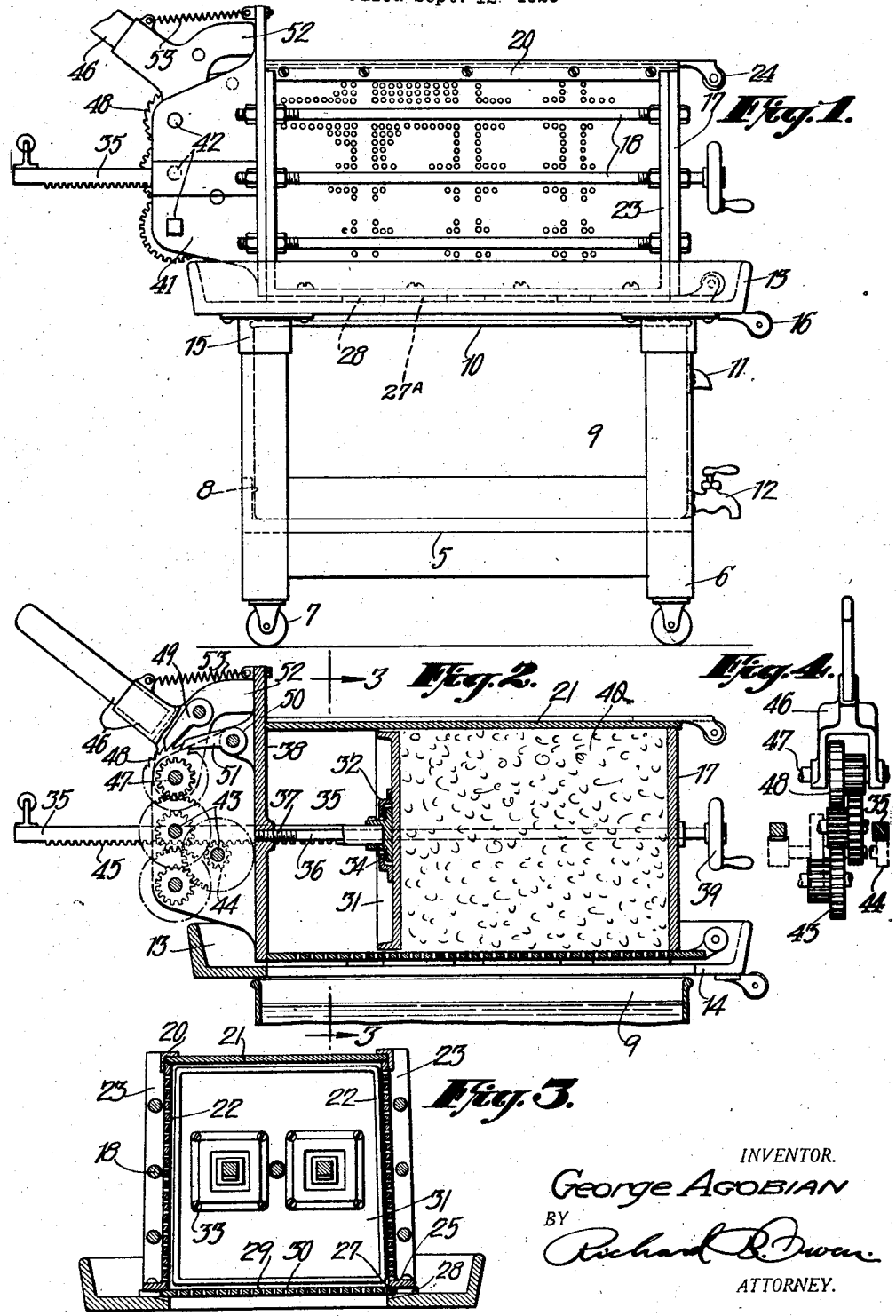
INVENTOR.
George Agobian
BY
ATTORNEY.

Patented Sept. 6, 1927.

1,641,245

UNITED STATES PATENT OFFICE.

GEORGE AGOBIAN, OF BROOKLYN, NEW YORK.

FRUIT-PRESSING MACHINE.

Application filed September 12, 1925. Serial No. 56,057.

This invention relates to fruit presses of the automatic type and in particular to one adapted to be operated by hand to thoroughly compress fruit, such as, grapes, so that the liquor therefrom can be used for various purposes.

A particular object of the invention is to provide a fruit press which will be strong and durable and through the medium of which a high pressure can be exerted by the operating piston to thoroughly squeeze the fruit to extract therefrom their juices.

A further object of the invention is to provide a fruit press in the nature of a machine, the parts of which are substantially constructed so that they will not get out of order and will not break under a squeezing pressure.

A still further object of the invention is to provide a fruit press of the mechanical type which will thoroughly squeeze the juice out of fruit without the necessity of handling the same.

To enable others skilled in the art to fully comprehend the underlying features of my invention that they may embody the same in the various modifications, in structure and relation contemplated, drawings depicting a preferred form have been annexed as a part of this disclosure and in such drawings similar reference characters denote corresponding parts throughout all the views, of which, Figure 1 is a side view in elevation of the fruit press constructed in accordance with my invention.

Figure 2 is a side elevation in section, the upper part of the fruit press only being shown to illustrate the gear train which operates the press to thoroughly squeeze the fruit held therein.

Figure 3 is a section taken on the line 3—3 of Figure 2 and shows the construction of the fruit press in cross sectional elevation, the piston operating rack being clearly shown, and Figure 4 is a rear view in elevation of the piston operating gears through the medium of which the press is manipulated.

Referring to the drawings in detail, 5 indicates the lower frame portion or tank supporting element of the press which joins the legs 6 which are supported on the suitable rollers or casters 7, whereby the press may be moved from place to place. The tank support at the rear end of the press is provided with an upturned portion 8, which limits the sliding movement of the juice tank 9, which is disposed on said tank support 5 with its rear end abutting the upwardly extended portion 8 of the tank support. This tank may be of any suitable metal which is non-corroding and which is sanitary, such for instance, as Monel metal and is provided around its upper edge with a suitable reenforcing bead 10 and on its front face a handle 11 and faucet 12 through the latter of which the liquor or juices extracted from the fruit may be drawn at will. The upper ends of the legs 6 are joined by the trough member 13 which extends around the four sides of the press and is disposed in overhanging relation to the leg members 6, the forward portion of the trough 13 being cut out as at 14 for a purpose hereinafter to be described. The trough is connected through the medium of the bracket 15 to the leg members 6 and is provided at its forward end with the handle 16 through the medium of which the press in its entirety may be drawn around on its wheel members or casters 7. The body of the press consists of the end corner pieces 17 which are joined by the longitudinally extending bar members 18, the latter being threaded at their opposite ends where they pass through said members 17 so that the locking nut 19 may be threaded thereon to securely hold the ends of the press in proper spaced relation. These ends or corner members 17 are provided at their top with a longitudinally disposed angular portion 20 which forms a guide for the top 21 of the press and also for the tapered sides 22 thereof. The rod 18 or bolt member not only secure these ends or corner pieces 17 in spaced relation but also pass through the flange portions 23 of said side members 22 and retain the same in proper position and in slightly spaced relation from the angle pieces 20 whereby the cover or top 21 of the press may be slid therebetween to its position through the medium of the handle 24 provided at its forward end. The bottom of the sides 22 is flanged as at 25 and through the medium of the bolts or screws 26 are secured in fixed position on the inner edges of the trough member 13. The trough member at its inner edge beneath said side portions 22 is beveled as at 27 to provide a passageway whereby the juice caught in the trough may find its way into the tank 9. The sides 22 are slightly tapered as shown in Figure 3 so that the fruit, after being pressed can be easily forced downwardly out of the press. The flange portions 25 are spaced from the trough through the medium of longitudinal strips 27A which are spaced as at 28 to provide openings therebetween through which the juice or liquor caught in the trough may pass. The spacing of the flange 25 from the bottom of the trough provides a slot in which is disposed the bottom of the press 29, it being of course understood that the bottom and sides of the press are thoroughly perforated as at 30 so that the juice of the fruit being pressed will find its way through said perforations into the trough and thence into the tank 9. In order to press the fruit I provide a suitable piston 31 which carries on the outer face thereof the keeper plates 32 which are suitably riveted or molded to the piston 31 as at 33 and holds therein the flanged end 34 of an anchor in which is held in any suitable manner the end of a rack 35, it being understood of course that there are two of these keeper plates, anchors and racks provided at opposite sides of the piston so that the same may be operated to prevent deviation from a vertical plane in its pressure exerting movement. The piston has passing therethrough a guide rod or screw 36, one end of which is threaded as at 37 into the rear wall 38 of the press, the forward end of the screw 36 passing through the front wall 17 in which it is journaled and it carries at its outer end the hand wheel 39 whereby the distance of the front wall from the rear wall may be finally adjusted and also added strength can be given to said front wall against the action of the piston 31 in compressing fruit therebetween.

It is evident that a movement inwardly of the rack 35 will cause a forward movement of the piston to compress the fruit 40 or other material in the press and the juice therefrom will exude through the openings 30 in the side walls and bottom of the press to be caught in the trough to be conveyed to the tank 9.

The rear wall 38 of the press through which the longitudinal bolts or bars 18 pass to hold the same in contact with the flange 23 of the sides 22 is provided with rearwardly extending spaced walls 41 in which are journaled as at 42 the various operating shafts which carry a suitable gear frame 43, one of the gears 44 of which operates on the two sides 45 of the rack 35, this being clearly shown in Figure 4 in which the gearing is so arranged relatively to the rack that the operation of the gearing to cause an inward movement of the rack is apparent. The lowermost one of the shafts 42 extends beyond the frame and is squared at its end to receive a winding handle whereby the piston can be rapidly retracted when the fruit has been thoroughly pressed. In order to set the gear train in motion, I provide a hand lever 46 pivoted to the shaft 47 to which is also secured the ratchet wheel 48, the handle 46 being arranged relatively to the ratchet 48 so that a pawl 49 carried thereby upon a downward movement of the handle will engage the teeth of the ratchet 48 causing the same to revolve and causing operation of the gear train to project the rack inwardly to compress the fruit between the walls of the press. In order to provide against the expansion of the fruit to cause a rearward movement of the piston when the same has once been advanced to a position, I provide on the walls 38 a boss 50, in which is pivoted the dog 51 which prevents retractile movement of the ratchet wheel 48. The handle 46 or operating lever is provided with an extended foot portion 52 which is urged and normally maintained against the wall 38 through the medium of the tension spring 53, which connects said operating lever with said wall 38. It will be evident therefore that a downward movement of the operating handle 46 will set the gear train in motion to advance the plunger 31 or piston to compress the fruit.

When retraction of the piston is desired, the pawls 49 and 51 are disengaged from the ratchet wheel 48. It will be noted that the rack teeth 45 do not extend to the outer end of the rack. This is to prevent breaking of the press when the fruit has been thoroughly pressed, by preventing the gears from further advancing the piston. In order to retract the piston, I draw the racks rearwardly until the teeth are in engagement with the gear and for convenience, I may provide a connecting handle for the racks 35, shown in Figures 1 and 2 as at 35A.

It will be evident that I have provided a fruit press which is of substantial construction and to which a maximum amount of squeezing pressure can be imparted to thoroughly squeeze the fruit therein so that every bit of juice can be obtained therefrom. It will also be evident that I have provided a press having a gear train for operation which will greatly multiply the power exerted in the manual operation of the press so that an enormous pressure can be exerted by the piston in the squeezing of the fruit.

I have also provided in conjunction with this press means whereby the press may be taken completely apart for cleaning which is most necessary in presses of this character in which fruit is treated and which must afterwards be consumed and in which the sanitary handling thereof plays an important part.

It will be also evident that I have provided a fruit press in which every bit of juice may be extracted from the fruit without waste and in which any quantity of the liquor may be drawn off at will for testing or consumption.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claims.

Having thus described my invention what I claim as new and desire to secure by United States Letters Patent is:

1. A fruit press comprising a frame, a container in said frame, a removable, perforated bottom in said container, a tray forming part of said frame and having its bottom wall tapered to form a drain, a removable receptacle in said frame, end members in the container and means for adjustably holding said end members together.

2. A fruit press comprising a frame, a container in said frame, a removable perforated bottom in said container, a tray forming part of said frame and having its bottom wall tapered to form a drain, a fruit pressing piston operable through the container, means for advancing and retracting said piston, a removable receptacle in said frame, end members in the container and means for adjustably holding said end members together.

GEORGE AGOBIAN.